United States Patent
Rajput et al.

(10) Patent No.: US 11,825,310 B2
(45) Date of Patent: Nov. 21, 2023

(54) METHODS, SYSTEMS, AND COMPUTER READABLE MEDIA FOR MITIGATING 5G ROAMING SPOOFING ATTACKS

(71) Applicant: Oracle International Corporation, Redwood Shores, CA (US)

(72) Inventors: Jay Rajput, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 186 days.

(21) Appl. No.: 17/095,420

(22) Filed: Nov. 11, 2020

(65) Prior Publication Data

US 2022/0104020 A1 Mar. 31, 2022

(30) Foreign Application Priority Data

Sep. 25, 2020 (IN) .............................. 202041041754

(51) Int. Cl.
*H04W 12/10* (2021.01)
*H04W 36/14* (2009.01)
*H04W 8/02* (2009.01)
*H04W 84/04* (2009.01)

(52) U.S. Cl.
CPC ............ *H04W 12/10* (2013.01); *H04W 8/02* (2013.01); *H04W 36/14* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 6,091,958 A | 7/2000 | Bergkvist et al. |
| 6,151,503 A | 11/2000 | Chavez |
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |

(Continued)

FOREIGN PATENT DOCUMENTS

| CN | 101277541 A | 10/2008 |
|---|---|---|
| CN | 10135561 A | 1/2009 |

(Continued)

OTHER PUBLICATIONS

S3-181480_pub.date_16-April-2018.pdf (Year: 2018).*

(Continued)

*Primary Examiner* — Jinsong Hu
*Assistant Examiner* — Alexander J Yi
(74) *Attorney, Agent, or Firm* — Jenkins, Taylor & Hunt, P.A.

(57) ABSTRACT

Roaming spoofing attacks can be initiated during N32-c handshake procedure used for inter-PLMN communication in 5G network. One example solution described herein uses the SEPP to mitigate the N32-c roaming spoofing attacks by cross validating the sender attribute present in N32-c handshake security capability exchange messages against the endpoint identity in the X.509v3 certificate shared during TLS handshake and the remote SEPP identity configured in the SEPP's local database.

12 Claims, 8 Drawing Sheets

(56) References Cited

U.S. PATENT DOCUMENTS

| | | |
|---|---|---|
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,637,838 B1 | 4/2020 | Larios et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,265,695 B2 | 3/2022 | Shah et al. |
| 11,272,560 B1 | 3/2022 | Vivanco et al. |
| 11,368,839 B2 | 6/2022 | Targali |
| 11,411,925 B2 | 8/2022 | Kumar et al. |
| 11,516,671 B2 | 11/2022 | Rajput et al. |
| 11,528,251 B2 | 12/2022 | Rajput et al. |
| 11,553,342 B2 | 1/2023 | Mahalank et al. |
| 11,622,255 B2 | 4/2023 | Iddya et al. |
| 11,689,912 B2 | 6/2023 | Nair et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0142547 A1 | 5/2017 | Hou et al. |

(56) References Cited

U.S. PATENT DOCUMENTS

| | | |
|---|---|---|
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0245280 A1 | 8/2017 | Yi et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364064 A1 | 11/2019 | Gupta et al. |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1 | 10/2020 | He et al. |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104112 A1 | 3/2022 | Rajput |
| 2022/0124079 A1 | 4/2022 | Patil et al. |
| 2022/0124479 A1 | 4/2022 | Iddya |
| 2022/0124501 A1 | 4/2022 | S Bykampadi et al. |
| 2022/0150212 A1 | 5/2022 | deaRajput |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0240084 A1 | 7/2022 | Speidel et al. |
| 2022/0256312 A1 | 8/2022 | Kim et al. |
| 2022/0264260 A1 | 8/2022 | Chaurasia et al. |
| 2022/0272069 A1 | 8/2022 | Verma et al. |
| 2022/0272541 A1 | 8/2022 | Rajput et al. |
| 2022/0369091 A1 | 11/2022 | Nair |

FOREIGN PATENT DOCUMENTS

| | | | |
|---|---|---|---|
| CN | 101742445 A | 6/2010 | |
| CN | 101917698 A | 12/2010 | |
| CN | 102656845 A | 9/2012 | |
| CN | 103179504 A | 6/2013 | |
| CN | 103444212 A | 12/2013 | |
| CN | 107800664 A | 3/2018 | |
| CN | 108307385 A | 7/2018 | |
| CN | 110035433 A | 7/2019 | |
| CN | 110800322 B | 5/2021 | |
| CN | ZL201880040478.3 | 4/2022 | |
| CN | ZL202080007649.X | 9/2022 | |
| EP | 1 067 492 A2 | 1/2001 | |
| EP | 1 906 682 A1 | 4/2008 | |
| EP | 2 204 955 A1 | 7/2010 | |
| EP | 2 785 125 B1 | 8/2018 | |
| EP | 3 493 569 A1 | 6/2019 | |
| EP | 3 646 630 B1 | 8/2021 | |
| EP | 3 662 630 | 8/2021 | |
| EP | 3954146 A1 | 2/2022 | |
| EP | 3 821 630 B1 | 7/2022 | |
| EP | 4183154 | 5/2023 | |
| EP | 3954146 B1 | 6/2023 | |
| ES | 2 548 005 T3 | 10/2015 | |
| GB | 2503973 A * | 1/2014 | ............ G06F 21/44 |
| IN | 401247 | 7/2022 | |
| JP | 2008-053808 A | 3/2008 | |
| JP | 7038148 B2 | 3/2022 | |
| JP | 7113147 B | 8/2022 | |
| JP | 7133010 | 8/2022 | |
| JP | 7133010 B2 | 9/2022 | |
| JP | 7198339 B | 12/2022 | |
| JP | 7234342 B2 | 3/2023 | |
| JP | 7246418 B2 | 3/2023 | |
| KR | 20180069737 A * | 6/2018 | ............ H04L 12/12 |
| WO | WO 01/88790 A1 | 11/2001 | |
| WO | WO 2005/091656 A1 | 9/2005 | |
| WO | WO 2005/101872 A1 | 10/2005 | |
| WO | WO 2007/084503 A2 | 7/2007 | |
| WO | WO 2008/053808 A1 | 5/2008 | |
| WO | WO-2010/021886 A1 | 2/2010 | |
| WO | WO 2010/045646 A2 | 4/2010 | |
| WO | WO 2010/105099 A2 | 9/2010 | |
| WO | WO 2011/010640 A1 | 1/2011 | |
| WO | WO 2011/047382 A2 | 4/2011 | |
| WO | WO 2016/201990 A1 | 12/2016 | |
| WO | WO 2017/082532 A1 | 5/2017 | |
| WO | WO 2018/202284 A1 | 11/2018 | |
| WO | WO 2019/005287 A1 | 1/2019 | |
| WO | WO 2019/027813 A1 | 2/2019 | |
| WO | WO 2019/158028 A1 | 8/2019 | |
| WO | WO 2019/224157 A1 | 11/2019 | |
| WO | WO 2020/013889 A1 | 1/2020 | |

(56) References Cited

FOREIGN PATENT DOCUMENTS

| WO | WO 2020/033113 A1 | 2/2020 |
|---|---|---|
| WO | WO 2020/036883 A1 | 2/2020 |
| WO | WO 2020/164763 A1 | 8/2020 |
| WO | WO 2020/174121 A1 | 9/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/138072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| WO | WO 2022/182448 A1 | 9/2022 |
| WO | WO 2022/240582 A1 | 11/2022 |

OTHER PUBLICATIONS

ETSI TS 129 573_pub.date_7-2020.pdf (Year: 2020).*
S3-192180_pub.date_24-June-2019.pdf (Year: 2019).*
Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-assigned, co-pending U.S. Appl. No. 17/129,487 for "Methods, Systems, and Computer Readable Media for Ingress Message Rate Limiting," (Unpublished, filed Dec. 21, 2020).
Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-assigned, co-pending U.S. Appl. No. 17/099,683 for "Methods, Systems, and Computer Readable Media for Validating Location Update Messages," (Unpublished, filed Nov. 16, 2020).
Notice of Allowance and Fee(s) Due and Examiner-Initiated Interview Summary for U.S. Appl. No. 16/379,488 (dated Oct. 23, 2020).
Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0, pp. 1-60 (Sep. 2020).

"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Servces and System Aspects; System architecture for the 5G System (5GS); Stage 2 (Release 16)," 3GPP TS 23.501, V16.6.0, pp. 1-447 (Sep. 2020).
"3rd Generation Partnership Project; Technical Specification Group Services and System Aspects; Procedures for the 5G Systems (5GS); Stage 2 (Release 16)," 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501, V16.5.1, pp. 1-440 (Aug. 2020).
Notification of Transmittal for the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services; (Release 16)," 3GPP TS 23.288, V16.4.0, pp. 1-66 (Jul. 2020).
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Applicant-Initiated Interview Summary for U.S. Appl. No. 16/100,172 (dated Jun. 9, 2020).
"3rd Generation Partnership Project; Technical Specification Group Core Network and Terminals; 5G System; Technical Realization of Service Based Architecture; Stage 3 (Release 16)," 3GPP TS 29.500, V16.4.0, pp. 1-79 (Jun. 2020).
"3rd Generation Partnership Project; Technical Specification Group Core Network and Terminals; 5G System; Network Data Analytics Services; Stage 3 (Release 16)," 3GPP TS 29.520, V16.4.0, pp. 1-91 (Jun. 2020).
Communication of European publication number and information on the application of Article 67(3) EPC for European Application Serial No. 18731923.1 (dated Apr. 8, 2020).
"3rd Generation Partnership Project; Technical Specification Group Services and System Aspects; Security architecture and procedures for 5G system (Release 16)," 3GPP TS 33.501, V16.2.0, pp. 1-227 (Mar. 2020).

(56) References Cited

OTHER PUBLICATIONS

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).
Non-Final Office Action for U.S. Appl. No. 16/100,172 (dated Mar. 6, 2020).
Notice of Allowance and Fee(s) Due and Examiner-Initiated Interview Summary for U.S. Appl. No. 15/666,300 (dated Feb. 13, 2020).
Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).
Advisory Action and Applicant-Initiated Interview Summary for U.S. Appl. No. 16/100,172 (dated Dec. 20, 2019).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V16.1.0, pp. 1-17 (Dec. 2019).
"FS.19 Diameter Interconnect Security," GSMA, pp. 1-3 (Dec. 20, 2019).
Notification of Transmittal of the International Search Report and the Written Opinion of the International Searching Authority, or the Declaration for International Application Serial No. PCT/US2019/042203 (dated Nov. 11, 2019).
Applicant-Initiated Interview Summary for U.S. Appl. No. 15/666,300 (dated Oct. 29, 2019).
Final Office Action for U.S. Appl. No. 16/100,172 (dated Oct. 3, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).
Decision on Appeal for U.S. Appl. No. 13/047,287 (Jun. 18, 2019).
Notification of Transmittal of the International Search Report and the Written Opinion of the International Searching Authority, or the Declaration for International Patent Application No. PCT/US2019/018990 (dated May 8, 2019).
Commonly-assigned, co-pending U.S. Appl. No. 16/379,488 for "Methods, Systems, and Computer Readable Media for Dynamically Learning and Using Foreign Telecommunication Network Mobility Management Node Information for Security Screening," (Unpublished, filed Apr. 9, 2019).
Non-Final Office Action for U.S. Appl. No. 16/100,172 (dated Apr. 11, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Sahu et al., "How 5G Registration Works," http://5gblogs.com/5g-registration/, 10 pages (Oct. 12, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile

(56) References Cited

OTHER PUBLICATIONS

Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for US. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015)
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://wwwappmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/U32009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
"3rd Generation Partnership Project; Technical Specification Group Core Network and Terminals; 5G System; Network Function Repository Services; Stage 3 (Release 16)," 3GPP TS 29.510, V16.4.0 pp. 1-206 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Dierks et al., "The Transport Layer Security (TLS) Protocol Version 1.2," RFC 5246, pp. 1-208 (Aug. 2008).
Housley et al., "Internet X.509 Public Key Infrastructure Certificate and Certificate Revocation List (CRL) Profile," RFC 3280, pp. 1-258 (Apr. 2002).

(56) References Cited

OTHER PUBLICATIONS

Notice of Allowance and Fee(s) Due and Examiner-Initiated Interview Summary for U.S. Appl. No. 17/185,934 (dated Jul. 21, 2022).
Non-Final Office Action for U.S. Appl. No. 17/099,683 (dated Jul. 15, 2022).
Decision to grant a European patent pursuant to Article 97(1) EPC for European Patent Application Serial No. 197108426 (dated Jun. 30, 2022).
Notice of Allowance for Chinese Application Serial No. 202080007649.X (dated Jun. 20, 2022).
Communication under Rule 71 (3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #SZ-139E pp. 1-4 (Aug. 19-Sep. 2, 2020).
First Office Action for Japanese Application Serial No. 2021545918 (dated Mar. 8, 2022).
Non-Final Office Action for U.S. Appl. No. 17/129,487 (dated Mar. 21, 2022).
Intention to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
"5G; Procedures for the 5G System (3GPP TS 23.502 version 15.3.0 Release 15)," ETSI TS 123 502, V15.3.0, pp. 1-330 (Sep. 2018).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).
Decision to grant a European patent pursuant to Article 97(1) EPC for European Patent Application Serial No. 18756018.0 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).

(56) References Cited

OTHER PUBLICATIONS

"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Commonly-assigned, co-pending U.S. Appl. No. 17/185,934 for "Methods, Systems, and Computer Readable Media for Mitigating Location Tracking and Denial of Service (DoS) Attacks that Utilize Access And Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0,pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573 V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DLR-Tel?-SMS Test Platform and SMS services, Nov. 6, 2020, pp. 1-6, https://telqtele.com/sms-fake-delivery-receipts-fake- dlr/.
Communication of European publication number and information on the application of Article 67(3) EPC for European Application Serial No. 18756018.0 (dated May 13, 2020).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).

DeKok, "The Network Access Identifier," Internet Engineering Task Force (IETF), RFC 7542, pp. 1-30 (May 2015).
Croft, N., "On Forensics: A Silent SMS Attack," Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71(3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Notice of Allowance and Fee(s) Due for U.S. Appl. No. 17/099,683 (dated May 8, 2023).
Interview Summary for U.S. Appl. No. 17/099,683 (dated Apr. 17, 2023).
Final Office Action for U.S. Appl. No. 17/099,683 (dated Apr. 6, 2023).
Applicant-Initiated Interview Summary for U.S. Appl. No. 17/099,683 (dated Apr. 5, 2023).
Notice of Allowance and Fee(s) Due for U.S. Appl. No. 17/008,528 (dated Mar. 30, 2023).
Office Action for Chinese Patent Application Serial No. 202080091056.6 (dated Mar. 25, 2023).
Applicant-Initiated Interview Summary for U.S. Appl. No. 17/123,038 (dated May 30, 2023).
Decision to Grant for European Patent Application 20720580.8 (dated May 11, 2023).
Notice of Publication for European Patent Application 21718461.3 (dated Apr. 26, 2023).
Final Office Action for U.S. Appl. No. 17/123,038 (dated Mar. 9, 2023).
Supplemental Notice of Allowability for U.S. Appl. No. 17/175,260 (dated Mar. 8, 2023).
Office Communication for U.S. Appl. No. 17/125,943 (dated Mar. 1, 2023).
Notice of Allowance and Fee(s) Due for U.S. Appl. No. 17/175,260 (dated Feb. 27, 2023).
Applicant Initiated Interview Summary for U.S. Appl. No. 17/008,528 (dated Feb. 21, 2023).
Intent to Grant for Japanese Patent Application No. 2020-572898 (dated Feb. 14, 2023).
Intent to Grant for Japanese Patent Application No. 2021-506739 (dated Jan. 24, 2023).
Notice of Allowance and Fee(s) Due for U.S. Appl. No. 17/319,023 (dated Feb. 10, 2023).
Non-Final Office Action for U.S. Appl. No. 17/125,943 (dated Feb. 9, 2023).
Supplemental Notice of Allowability for U.S. Appl. No. 17/076,482 (dated Jan. 19, 2023).
Non-Final Office Action for U.S. Appl. No. 17/129,441 (dated Jan. 19, 2023).
Intent to Grant for European Patent Application No. 18705270.9 (dated Dec. 8, 2022).
Applicant Initiated Interview Summary for U.S. Appl. No. 17/319,023 (dated Jan. 10, 2023).
Non-Final Office Action for U.S. Appl. No. 17/099,683 (dated Jan. 4, 2023).

(56) References Cited

OTHER PUBLICATIONS

Communication under Rule 71(3) EPC Intention to Grant for European Patent Application Serial No. 20 720 580.8 (dated Dec. 23, 2022).
Applicant-Initiated Interview Summary for U.S. Appl. No. 17/099,683 (dated Dec. 12, 2022).
Notice of Allowance and Fee(s) Due for U.S. Appl. No. 17/076,482 (dated Dec. 1, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Non-Final Office Action for U.S. Appl. No. 17/008,528 (dated Nov. 10, 2022).
Notification of reasons for refusal for Japanese Patent Application No. 2020-572898 (dated Oct. 25, 2022).
Advisory Action for U.S. Appl. No. 17/076,482 (dated Oct. 25, 2022).
Final Office Action and Applicant-Initiated Interview Summary for U.S. Appl. No. 17/099,683 (dated Oct. 24, 2022).
Communication of European publication number and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/319,023 (dated Sep. 28, 2022).
Non-Final Office Action for U.S. Appl. No. 17/123,038 (dated Sep. 30, 2022).
Communication of European publication number and information on the application of Article 67(3) EPC for European Patent Application Serial No. 20720580.8 (dated Jan. 19, 2022).
Non-Final Office Action for U.S. Appl. No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
"5G; Architecture enhancements for 5G System (5GS) to support network data analytics services (3GPP TS 23.288 version 16.4.0 Release 16)," ETSI TS 123 288, V16.4.0, pp. 1-68 (Jul. 2020).
Notice of Allowance for U.S. Appl. No. 17/123,038 (dated Jun. 23, 2023).
Notice of Publication for European Patent Application No. 21720355.3 (dated Jun. 7, 2023).
Notice of Allowance and Fee(s) Due/Applicant-Initiated Interview Summary for U.S. Appl. No. 17/129,441 (dated Jul. 19, 2023).

* cited by examiner

METHODS, SYSTEMS, AND COMPUTER READABLE MEDIA FOR MITIGATING 5G ROAMING SPOOFING ATTACKS

PRIORITY CLAIM

This application claims the priority benefit of Indian Provisional Patent Application Serial No. 202041041754, filed Sep. 25, 2020, the disclosure of which is incorporated herein by reference in its entirety.

TECHNICAL FIELD

The subject matter described herein relates to enhancing security in 5G communication networks. More particularly, the subject matter described herein relates to methods, systems, and computer readable media for mitigating 5G roaming spoofing attacks.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

One vulnerability that exists with the current 5G network architecture occurs on the N32 interface, which is the interface between SEPPs. As indicated above, an SEPP acts as the security screening node for a public land mobile network (PLMN). The N32 control or N32-c interface is used for the exchange of control messages with a remote SEPP. Initiation of communications on the N32-c interface involves a transport layer security (TLS) handshake procedure to establish a TLS connection. Initiation of communications also involves an N32-c security capability negotiation procedure, which involves the exchange of N32-c messages. During the N32-c security capability negotiation procedure, there is no validation of the remote endpoint's identity. The remote endpoint also does not validate the initiating SEPP's identity. Because of the lack of validation on the N32-c interface, the initiating and responding SEPPs are vulnerable to spoofing attacks where a third party impersonates one end of the N32-c communications to gain unauthorized access to the PLMN.

In light of these and other difficulties, there exists a need for methods, systems, and computer readable media for mitigating 5G roaming spoofing attacks.

SUMMARY

A method for mitigating 5G roaming spoofing attacks includes obtaining, by a security edge protection proxy (SEPP) and from a transport layer security (TLS) message from a first node, a first identifier for the first node. The method further includes obtaining, by the SEPP and from an N32-c security capability negotiation message from the first node, a second identifier for the first node. The method further includes comparing the first and second identifiers for the first node. The method further includes determining that first and second identifiers do not match and, in response, that second identifier for the first node is invalid. The method further includes, in response to determining that the second identifier for the first node is invalid, blocking inter-public land mobile network (PLMN) communications with the first node.

According to another aspect of the subject matter described herein, obtaining the first identifier for the first node from a TLS message includes obtaining the first identifier from a certificate contained a TLS certificate message.

According to another aspect of the subject matter described herein, the certificate comprises an X.509 certificate.

According to another aspect of the subject matter described herein, obtaining the first identifier for the first node includes extracting a fully qualified domain name (FQDN) for the first node from a subject alternative name field of the X.509 certificate.

According to another aspect of the subject matter described herein, the SEPP is a responding SEPP in an N32-c security capability negotiation procedure and wherein obtaining the second identifier for the first node includes extracting the second identifier for the first node from a sender attribute of a SecNegotiateReqData information element of the N32-c security capability negotiation message.

According to another aspect of the subject matter described herein, the SEPP is an initiating SEPP in an N32-c security capability negotiation procedure and wherein obtaining the second identifier for the first node includes extracting the second identifier for the first node from a sender attribute of a SecNegotiationRspData information element of the N32-c security capability negotiation message.

According to another aspect of the subject matter described herein, the method for mitigating 5G roaming security attacks includes obtaining, by the SEPP and from a TLS handshake message from a second node, a first identifier for the second node, obtaining a second identifier for the second node from an N32-c security capability negotiation message from the second node, comparing the first and second identifiers for the second node, determining that first and second identifiers match, performing a lookup in a peer SEPP database using one of the first and second identifiers for the second node, locating a matching identifier in the peer SEPP database, and in response to determining that the first and second identifiers for the second node match and that a matching identifier is present in the peer SEPP database, allowing inter-PLMN communications with the second node.

According to another aspect of the subject matter described herein, the method for mitigating 5G roaming security attacks includes obtaining, by the SEPP and from a TLS handshake message from a second node, an first identifier for the second node, obtaining, by the SEPP and from an N32-c security capability negotiation message from the second node, a second identifier for the second node, comparing the first and second identifiers for the second node, determining that first and second identifiers match, performing a lookup in a peer SEPP database using one of the first and second identifiers for the second node and failing to locate a matching identifier in the peer SEPP database, and in response to determining that the first and second identifiers for the second node match and that a matching identifier is not present in the peer SEPP database, blocking inter-PLMN communications from the second node.

According to another aspect of the subject matter described herein, a system for mitigating 5G roaming spoofing attacks includes a security edge protection proxy (SEPP) including at least one processor and a memory. The system further includes a 5G roaming spoofing attack mitigation module implemented by the at least one processor and configured to obtain, from a transport layer security (TLS) message from a first node, a first identifier for the first node, obtain, from an N32-c security capability negotiation message from the first node, a second identifier for the first node, compare the first and second identifiers for the first node, determine that first and second identifiers do not match and, in response, that second identifier for the first node is invalid, and, in response to determining that the second identifier for the first node is invalid, block inter-public land mobile network (PLMN) communications with the first node.

According to another aspect of the subject matter described herein, the 5G roaming spoofing attack mitigation module is configured to obtain the first identifier for the first node from a certificate contained in a TLS certificate message.

According to another aspect of the subject matter described herein, the 5G roaming spoofing attack mitigation module is configured to obtain the first identifier for the first node by extracting a fully qualified domain name (FQDN) for the first node from a subject alternative name field of the certificate.

According to another aspect of the subject matter described herein, the SEPP is a responding SEPP in an N32-c security capability negotiation procedure and wherein 5G roaming spoofing attack mitigation module is configured to obtain the second identifier for the first node by extracting the second identifier for the first node from a sender attribute of a SecNegotiateReqData information element of the N32-c security capability negotiation message.

According to another aspect of the subject matter described herein, the system of claim 9 wherein the SEPP is an initiating SEPP in an N32-c security capability negotiation procedure and wherein the 5G roaming spoofing attack mitigation module is configured to obtain the second identifier for the first node by extracting the second identifier for the first node from a sender information element attribute of a SecNegotiateRspData information element of the N32-c security capability negotiation message.

According to another aspect of the subject matter described herein, the 5G roaming spoofing attack mitigation module is configured to obtain, from a TLS handshake message from a second node, a first identifier for the second node, obtain, from an N32-c security capability negotiation message from the second node, a second identifier for the second node, compare the first and second identifiers for the second node, determine that first and second identifiers match, perform a lookup in a peer SEPP database using one of the first and second identifiers for the second node, locating a matching identifier in the peer SEPP database, and, in response to determining that the first and second identifiers for the second node match and that a matching identifier is present in the peer SEPP database, allow inter-PLMN communications with the second node.

According to another aspect of the subject matter described herein, the 5G roaming spoofing attack mitigation module is configured to obtain, from a TLS handshake message from a second node, a first identifier for the second node, obtain, from an N32-c security capability negotiation message from the second node, a second identifier for the second node, compare the first and second identifiers for the second node, determine that first and second identifiers match, perform a lookup in a peer SEPP database using one of the first and second identifiers for the second node and fail to locate a matching identifier in the peer SEPP database, and, in response to determining that the first and second identifiers for the second node match and that a matching identifier is not present in the peer SEPP database, block inter-PLMN communications from the second node.

According to another aspect of the subject matter described herein, a non-transitory computer readable medium having stored thereon executable instructions that when executed by a processor of a computer control the computer to perform steps is provided. The steps include obtaining, by a security edge protection proxy (SEPP) and from a transport layer security (TLS) message from a first node, a first identifier for the first node. The steps further include obtaining, by the SEPP and from an N32-c security capability negotiation message from the first node, a second identifier for the first node. The steps further include comparing the first and second identifiers for the first node; determining that first and second identifiers do not match and, in response, that second identifier for the first node is invalid. The steps further include, in response to determining that the second identifier for the first node is invalid, blocking inter-public land mobile network (PLMN) communications with the first node.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
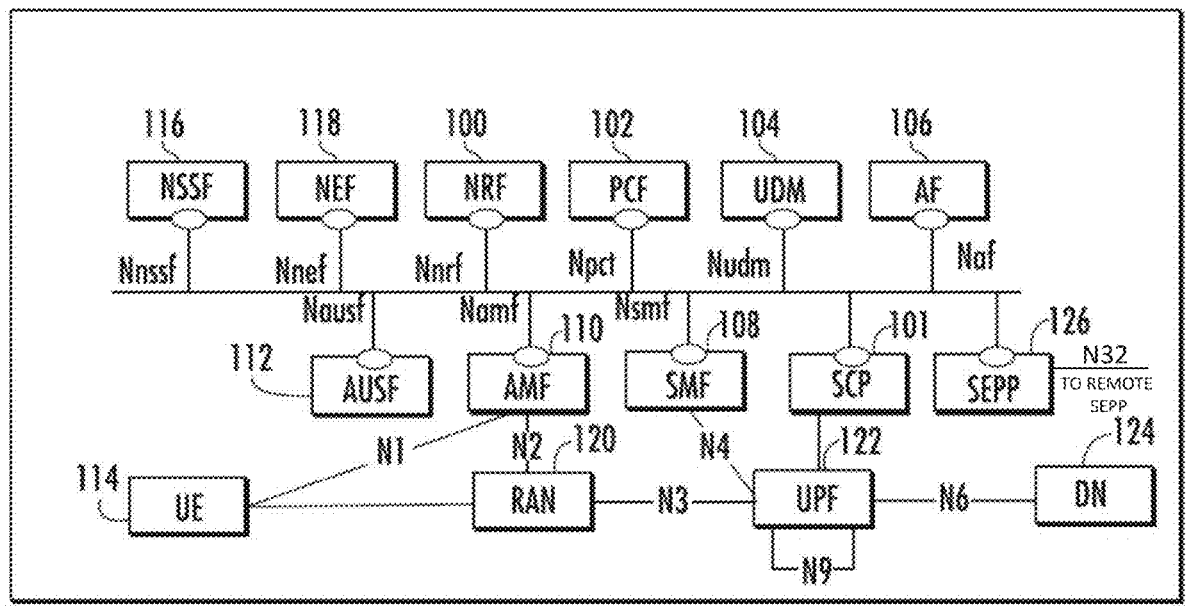
FIG. 1 is a network diagram illustrating an exemplary 5G network architecture.

The subject matter described herein relates to methods, systems, and computer readable media for mitigating 5G roaming spoofing attacks. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As stated above one problem with the existing 5G architecture is that the N32-c handshake does not validate remote endpoint identifications. In the absence of validation of endpoint identification, a malicious SEPP can try to spoof the identity of another SEPP and launch security attacks. The responding SEPP does not validate whether the N32 handshake messages are received from a legitimate initiating SEPP. Similarly, the initiating SEPP does not validate whether the N32-c handshake message is sent to a legitimate responding SEPP. The subject matter described herein addresses these and other difficulties by cross-validating the N32-c identity of an SEPP with a TLS layer identity and with peer SEPP identities stored in a peer SEPP database maintained by initiating and responding SEPPs.

Figure 2:
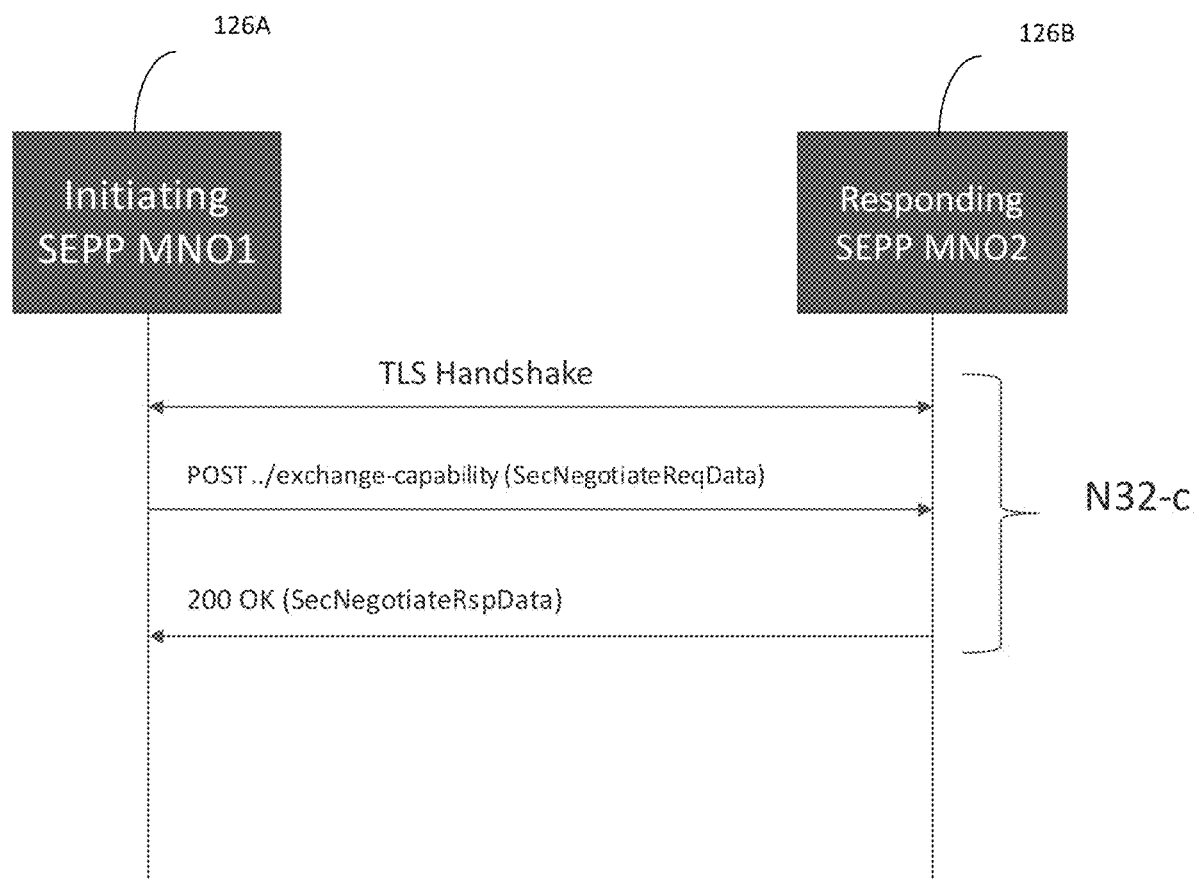
FIG. 2 is a message flow diagram illustrating the exchange of transport layer security (TLS) and N32-c messages between SEPPs.

FIG. 2 illustrates handshakes that occur between SEPPs on the N32 interface. In FIG. 2, initiating SEPP 126A and responding SEPP 126B exchange TLS handshake messaging and N32-c security capability negotiation messaging over the N32 interface. The TLS handshake involves the exchange of certificates, which can be used to validate the identity of the sender at the TLS layer and are difficult to spoof. However, there is no cross-validation between identities exchanged during the TLS handshake with the identities exchanged during the N32-c security capabilities negotiation messaging. As a result, both initiating SEPP 126A and responding SEPP 126B are vulnerable to roaming spoofing attacks. A roaming spoofing attack is an attack where an attacker masquerades as a node in a network in which a mobile subscriber is roaming. In the case of spoofing the identity of a node during the N32-c security capability negotiation procedure, the attacker spoofs the identity of an SEPP serving a network in which a subscriber is roaming.

Figure 3:
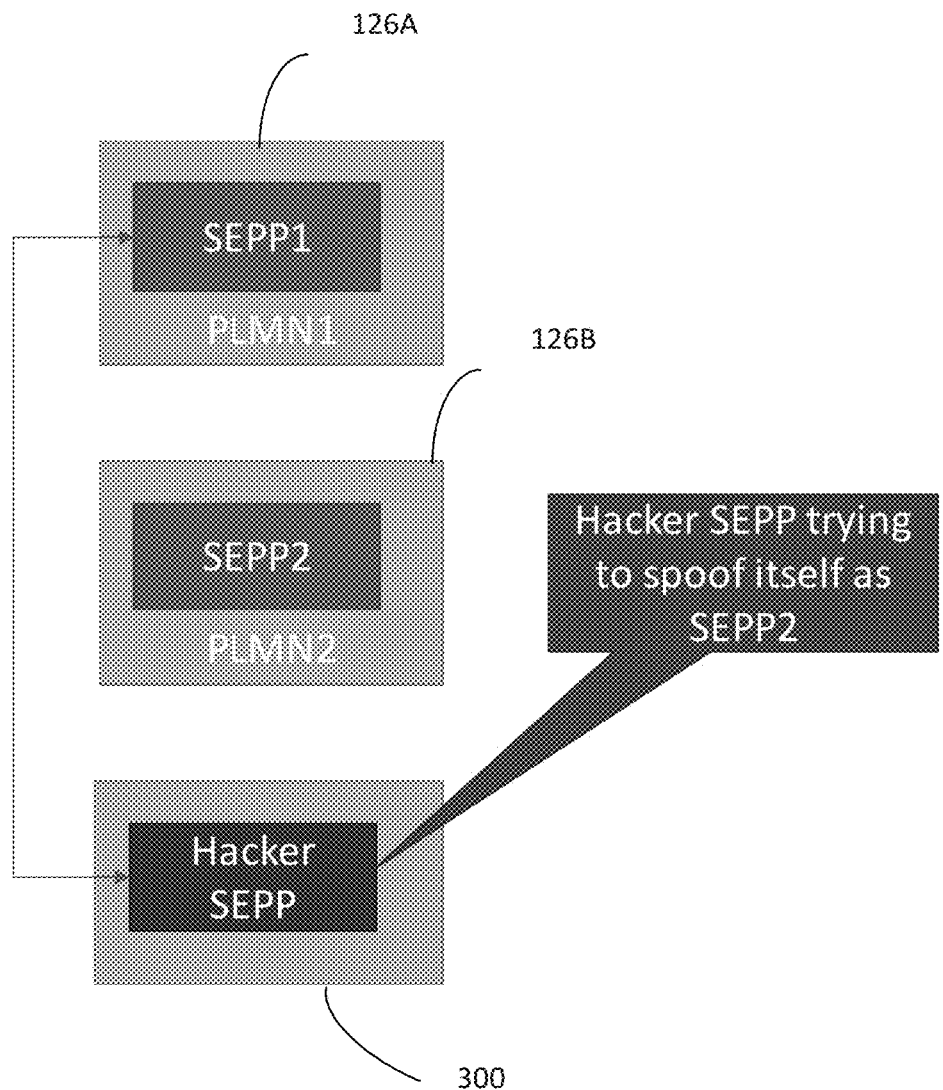
FIG. 3 is a network diagram illustrating a hacker impersonating an SEPP.

FIG. 3 illustrates an example of a hacker SEPP 300 masquerading as a legitimate SEPP. In FIG. 3, SEPP 126A located in PLMN1 may believe that it is communicating with peer SEPP 126B located in a PLMN2. However, hacker SEPP 300 may impersonate legitimate SEPP 126B and establish N32-c communications with SEPP 126A. Once such communications are established, hacker SEPP 300 may be able to obtain confidential subscriber information from PLMN1 and/or generate other types of attacks, such as denial of service attacks, on PLMN1.

Figure 4:
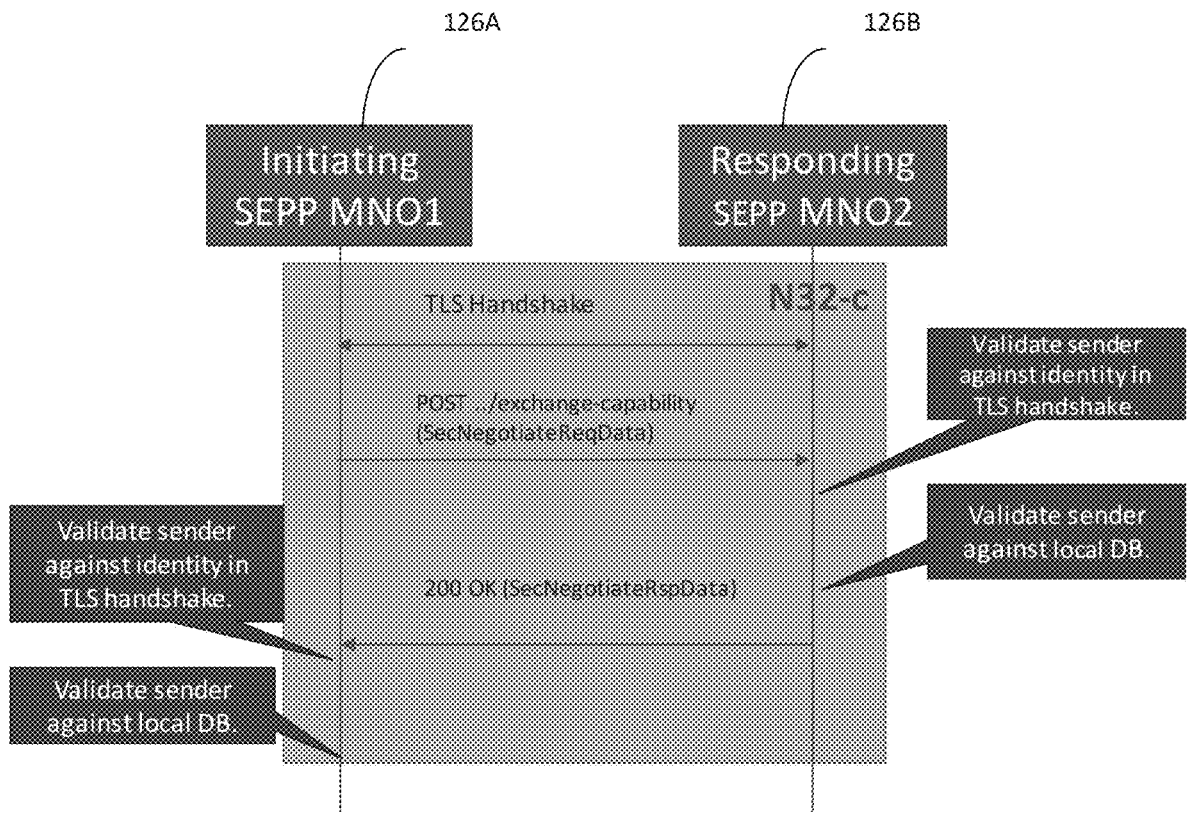
FIG. 4 is a message flow diagram illustrating validation of identities presented in N32-c messages exchanged between SEPPs.

To avoid or reduce the likelihood of a successful spoofing attack on the N32-c interface, SEPPs 126A and 126B may cross-validate N32-c identities with TLS identities and may also validate the N32-c identities with peer SEPP identities using a configured peer SEPP database. FIG. 4 illustrates exemplary cross validation that may be performed by initiating SEPP 126A and responding SEPP 126B. Referring to FIG. 4, initiating SEPP 126A and responding SEPP 126B may exchange TLS handshake messages over the N32-c interface to establish a TLS connection. The TLS handshake involves the exchange of client and server hello messages followed by the exchange of certificate messages. The certificate messages contain the X.509 certificate of the sender. The identity of the sender is contained in the X.509 certificate and is difficult to spoof because the X.509 certificate is signed by a certificate authority.

Accordingly, in one example, the sender's identity extracted from the X.509 certificate may be used to cross validate the sender's N32-c identity. The TLS handshake protocol is defined in Internet Engineering Task Force (IETF) Request for Comments (RFC) 5246 and includes the exchange of certificate messages by both ends of the TLS connection. The structure of a TLS handshake message defined in IETF RFC 5246, including the certificate message, appears below:

```
enum {
    hello_request(0), client_hello(1), server_hello(2),
    certificate(11), server_key_exchange (12),
    certificate_request(13), server_hello_done(14),
    certificate_verify(15), client_key_exchange(16),
    finished(20), (255)
} HandshakeType;
struct {
    HandshakeType msg_type;    /*    handshake type */
    uint24 length;             /*    bytes in message */
    select (HandshakeType) {
        case hello_request:          HelloRequest;
        case client_hello:           ClientHello;
        case server_hello:           ServerHello;
        case certificate:            Certificate;
        case server_key_exchange:    ServerKeyExchange;
        case certificate_request:    CertificateRequest;
        case server_hello_done:      ServerHelloDone;
        case certificate_verify:     CertificateVerify;
        case client_key_exchange:    ClientKeyExchange;
        case finished:               Finished;
    } body;
} Handshake;
```

As illustrated by the TLS handshake message structure, one of the defined handshake message types is the certificate message, which contains the certificate of the client or server, depending on whether the sender is functioning as a client or a server. In establishing secure TLS communications over the N32-c interface, mutual TLS or m-TLS is used where both ends of the TLS connection receive and validate the other end's X.509 certificate. IETF RFC 5246 indicates that the type of certificate must be X.509v3 unless expressly negotiated otherwise. The examples described herein used the X.509v3 certificate as an example, but the subject matter described herein is not limited to only using the identity of the sender extracted from an X.509v3 to validate an N32-c identity of a sender. The X.509v3 certificate format is defined in IETF RFC 3280. According to IETF RFC 3280, one extension or parameter that may be included in an X.509v3 certificate is the subject alternative names extension. The subject alternative names extension is defined as follows:

The subject alternative names extension allows additional identities to be bound to the subject of the certificate. Defined options include an Internet electronic mail address, a DNS name, an IP address, and a uniform resource identifier (URI). Other options exist, including completely local definitions. Multiple name forms, and multiple instances of each name form, MAY be included. Whenever such identities are to be bound into a certificate, the subject alternative name (or issuer alternative name) extension MUST be used; however, a DNS name MAY be represented in the subject field using the domainComponent attribute as described in section 4.1.2.4.

Because the subject alternative name is considered to be definitively bound to the public key, all parts of the subject alternative name MUST be verified by the CA.

As indicated above, the subject alternative names extension of the X.509v3 certificate may contain a DNS name, IP address, or a URI that identifies the subject of the certificate and that is verified by the certificate authority. Because the subject alternative name is verified by the certificate authority, the subject alternative name is difficult to spoof. However, simply ensuring that a sender has a valid X.509 certificate does not validate the identity of the sender at the N32-c application level. To perform such cross-validation, initiating SEPP 126A and responding SEPP-126B may extract identities from N32-c messages and compare these identities to the identities extracted from the X-509 certificate shared during the TLS handshake. If the identities match, SEPPs 126A and 126B may perform a further validation step of comparing the identity extracted from either the N32-c message or the TLS message with a database of configured peer SEPP identities. If either validation fails, the SEPP may block inter-PLMN communications with the remote node, identifying the remote node as an attacker.

Returning to FIG. 4, after the TLS handshake messages are exchanged and a TLS connection is established between initiating SEPP 126A and responding SEPP 126B, initiating SEPP 126A sends an HTTP POST message to responding SEPP 126B. The HTTP POST message includes the Sec-NegotiateReqData information element, which includes the sender information element containing the FQDN of the sender. Responding SEPP 126B receives the HTTP POST message, extracts the FQDN of the sender from the SecNegotiateReqData information element, and validates the FQDN against the identity of the send obtained from the sender's X.509 certificate. In this case, it is assumed that the identities match. Accordingly, in the next step, responding SEPP 126B performs a lookup for the sender's identity the peer SEPP database maintained by responding SEPP 126B. It is assumed that the identity of initiating SEPP 126A is on present in the peer SEPP database of responding SEPP 126B, so both validations pass from the perspective of responding SEPP 126B, and, as a result, responding SEPP 126B will allow inter-PLMN communications from initiating SEPP 126A.

Figure 5:
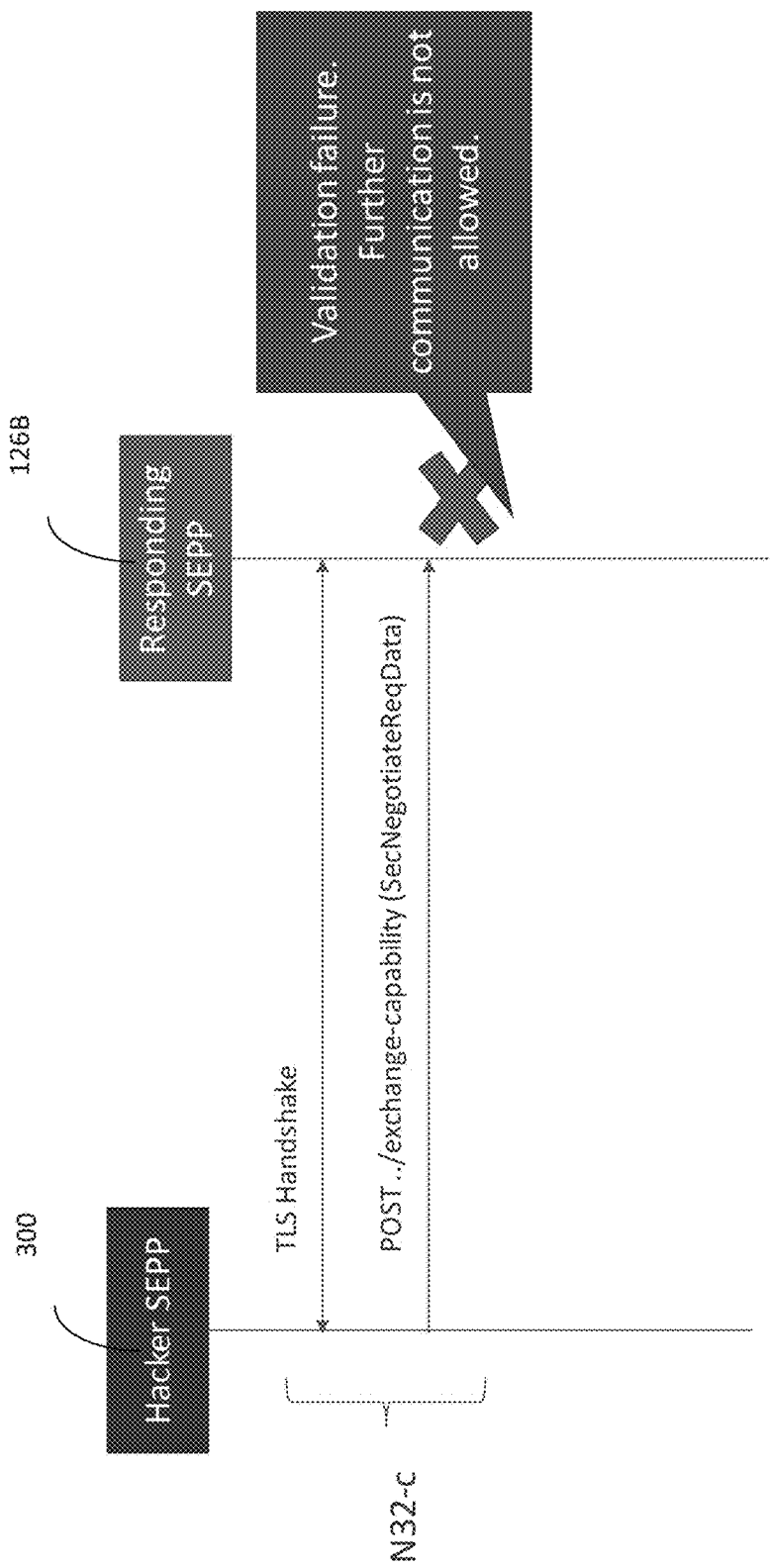
FIG. 5 is a diagram illustrating the blocking of messages by a responding SEPP upon a validation failure on the N32-c interface.

Continuing with the message flow in FIG. 4, responding SEPP 126B sends an HTTP 200 OK message to initiating SEPP 126A. The HTTP 200 OK message includes the N32-c SecNegotiateRspData information element including the sender attribute. In FIG. 5, the sender attribute carries the FQDN of responding SEPP 126B. Initiating SEPP 126B receives the HTTP 200 OK message, extracts the sender's FQDN from the sender attribute of the SecNegotiateRspData information element, and compares the FQDN with the FQDN for the sender extracted from the TLS certificate message. In this case, the FQDNs are assumed to match. Accordingly, initiating SEPP 126A performs a further validation step of determining whether the identity of the sender is present in the peer SEPP database maintained by initiating SEPP 126A. In this example, the identity of the sender is assumed to be present, and, as such, initiating SEPP 126A allows inter-PLMN communications with responding SEPP 126B.

FIG. 5 illustrates the case where hacker SEPP 300 is the initiating SEPP with respect to the N32-c security capability negotiation procedure. In FIG. 5, hacker SEPP 300 initiates a TLS handshake with responding SEPP 126B. Responding SEPP 126B extracts the X.509 certificate from a TLS handshake message and extracts an identity presented by hacker SEPP 300 in the certificate. Hacker SEPP 300 communicates an identity to responding SEPP 126B in an N32-c SecNegotiateReqData information element of N32-c security capability negotiation message, which in the illustrated example is an HTTP POST message. Responding SEPP 126B extracts the identity presented by hacker SEPP 300 in the N32-c SecNegotiateReqData information element of the N32-c security capability negotiation message and compares the identity extracted from the SecNegotiateReqData information element of the N32-c security capability negotiation message with the identity extracted from the certificate obtained from the TLS message. In this case, the identities do not match. As a result, responding SEPP 126B determines that a validation failure has occurred. Accordingly, responding SEPP 126B blocks further communications from hacker SEPP 300.

Figure 6:
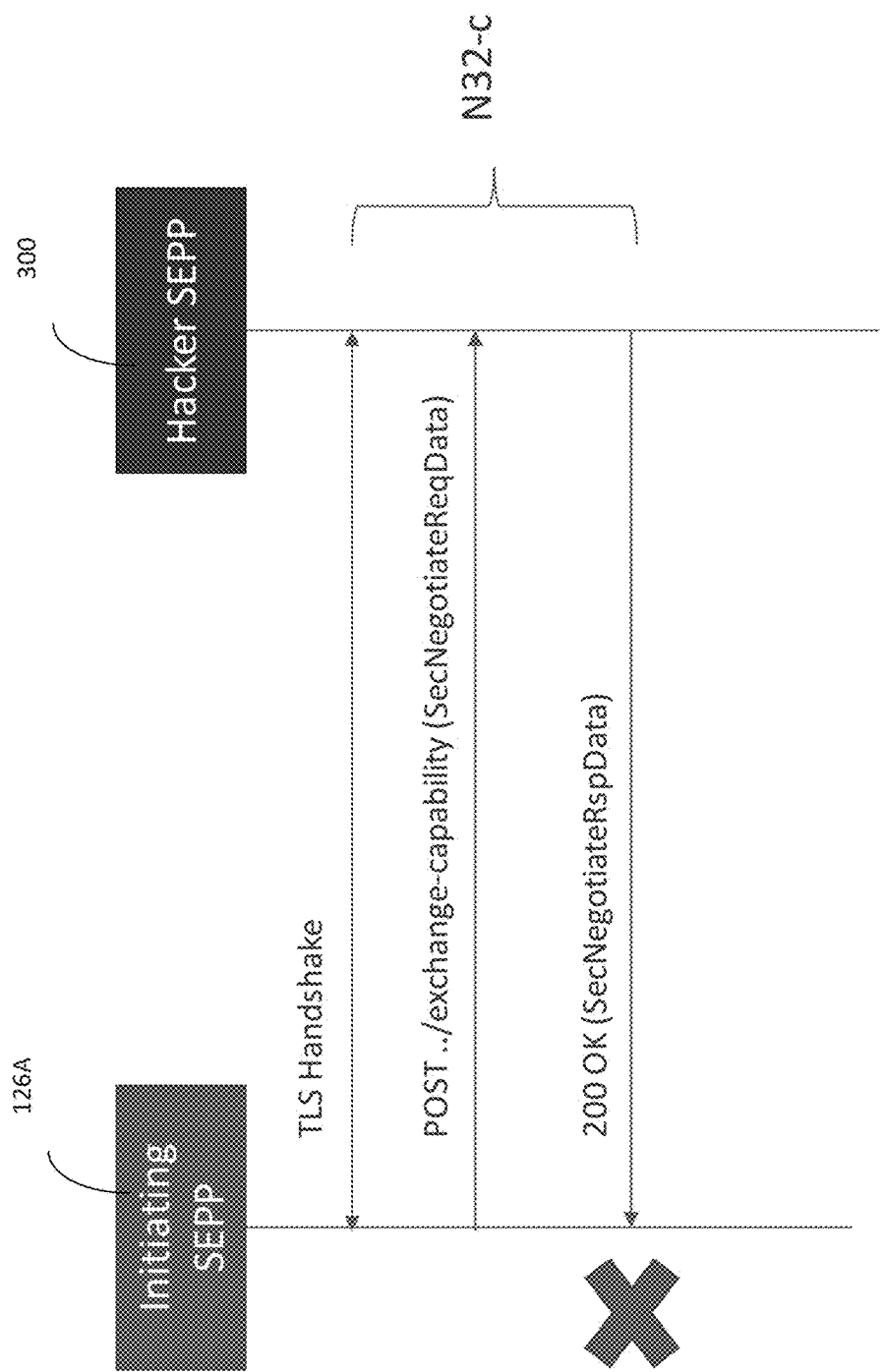
FIG. 6 is a diagram illustrating the blocking of messages by an initiating SEPP upon a validation failure on the N32-c interface.

FIG. 6 illustrates the case where the SEPP performing the TLS and N32-c identity cross validation is the initiating SEPP in the N32-c security capability negotiation transaction. In FIG. 6, initiating SEPP receives TLS and N32-c messages from hacker SEPP 300. Initiating SEPP 126A obtains the X.509 certificate from one of the TLS handshake messages. Initiating SEPP 126A extracts the identity from the X.509 certificate and compares the identity to an identity received from hacker SEPP 300 in the SecNegotiateRspData information element of the N32-c security capability negotiation message, which in the illustrated example, is an HTTP 200 OK message. In this case, the identities do not match. Accordingly, initiating SEPP 126A blocks further communications from hacker SEPP 300.

Figure 7:
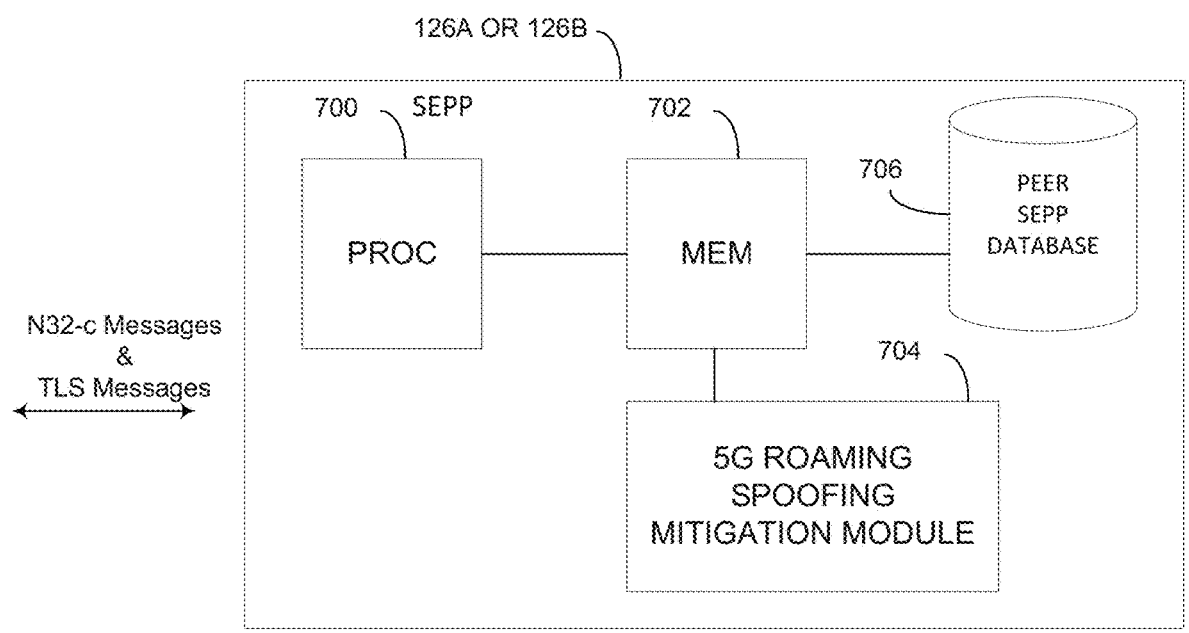
FIG. 7 is a block diagram illustrating an exemplary architecture of an SEPP for mitigating 5G roaming spoofing attacks.

FIG. 7 is a block diagram illustrating an exemplary architecture for SEPP 126A or 126B. SEPP 126A or 126B includes at least one processor 700 and a memory 702. SEPP 126A or 126B further includes a 5G roaming spoofing mitigation module 704 that performs these steps described herein for cross-validating identities in N32-c messages with identities extracted from TLS messages. SEPP 126A or 126B further includes a peer SEP database 706 that is configured with identities of peer SEPPs with which inter-PLMN communications are allowed. 5G roaming spoofing mitigation module 704 may be implemented by processor 700 and may also perform the cross check of the N32-c identity presented by a remote node against the peer SEPP identities stored in database 706. If the identity of a remote node presented in an N32-c security capability negotiation message is not present in database 706 or if the cross check with the TLS identity fails, 5G roaming spoofing mitigation module 704 may block inter-PLMN communications with the remote node. If both identity cross checks pass, 5G roaming spoofing mitigation module 704 may allow inter-PLMN communications with the remote node.

Figure 8:
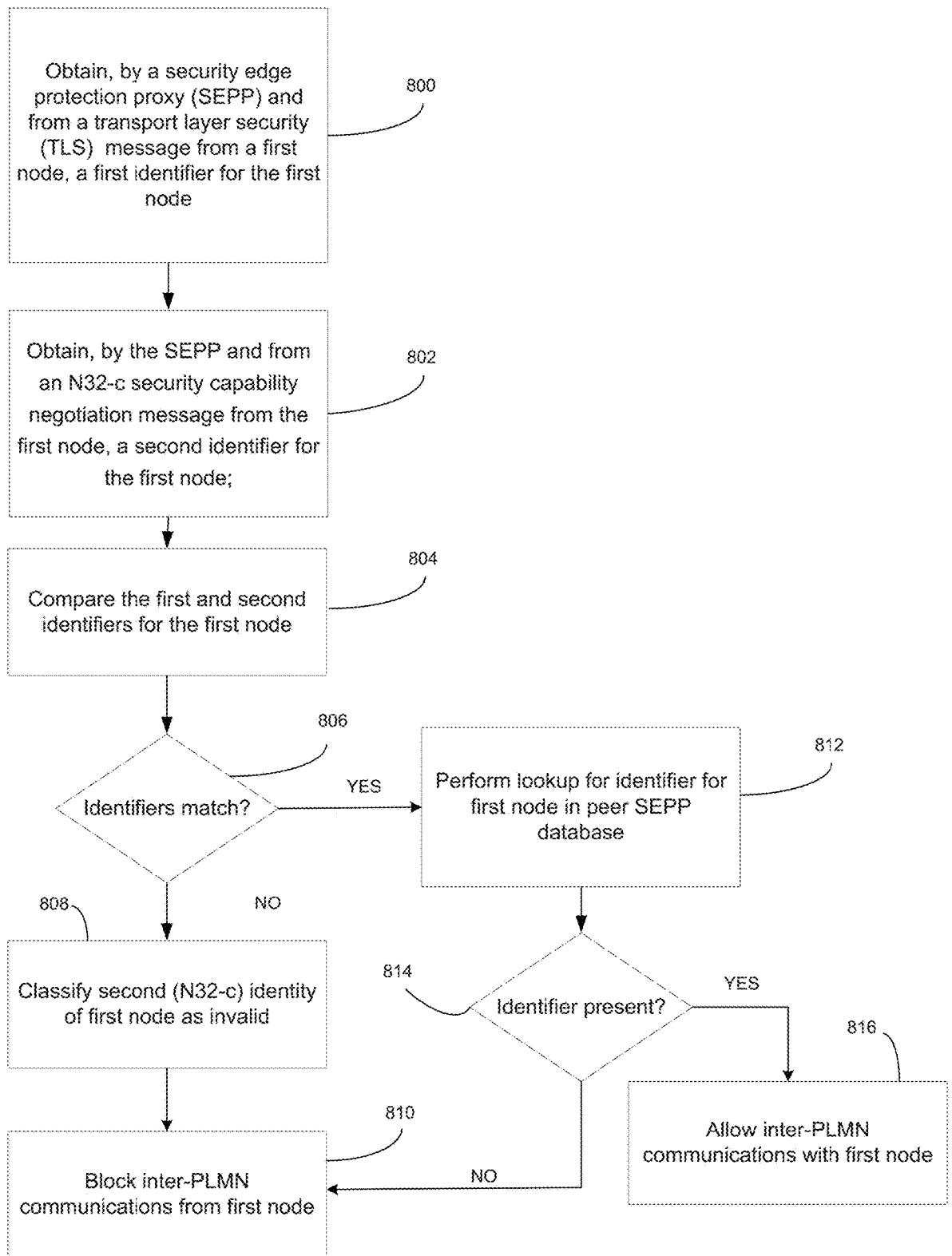
FIG. 8 is a flow chart illustrating an exemplary method for mitigating 5G roaming spoofing attacks.

FIG. 8 is a flow chart illustrating an exemplary method for mitigating 5G speaking attacks. Referring to FIG. 8, in step 800, the SEPP obtains a first identifier from a TLS message from a first node. For example, an initiating or responding SEPP 126A or 126B may extract an identity for a sending node from an alternative ID field of a X.509 certificate in a TLS message received from a sending node. The TLS message may be a certificate message exchanged with a remote node as part of the TLS handshake procedure used to establish the TLS connection with the remote node.

In step 802, the SEPP obtains, from an N32-c security capability negotiation message from the first node, a second identifier for the first node. For example, if the SEPP is an initiating SEPP for purposes of the N32-c security capability negotiation transaction, the initiating SEPP may extract the N32c identity from the sender ID attribute of an N32-c SecNegotiateRspData information element of the HTTP 200 OK message from the remote node. If the if the SEPP is a responding SEPP for purposes of the N32-c security capability negotiation transaction, the responding SEPP may extract the N32c identity from the sender ID attribute of an N32-c SecNegotiateReqData information element of an HTTP POST message from the remote node. Tables 1 and 2 shown below correspond to tables 6.1.5.2.2.1 and 6.5.1.2.2 of 3GPP TS 29.573, which illustrate the attributes that may be included in the SecNegotiateReqData and SecNegotiateRspData information elements that are part of the N32-c security capability negotiation.

TABLE 1

Definition of type SecNegotiateReqData

| Attribute name | Data type | P | Cardinality | Description |
| --- | --- | --- | --- | --- |
| sender | Fqdn | M | 1 | This IE shall uniquely identify the SEPP that is sending the response. This IE is used to store the negotiated security capability against the right SEPP. |

TABLE 1-continued

Definition of type SecNegotiateReqData

| Attribute name | Data type | P | Cardinality | Description |
|---|---|---|---|---|
| supportedSecCapabilityList | array(SecurityCapability) | M | 1 ... N | This IE shall contain the list of security capabilities that the requesting SEPP supports. |

TABLE 2

Definition of type SecNegotiateRspData

| Attribute name | Data type | P | Cardinality | Description |
|---|---|---|---|---|
| sender | Fqdn | M | 1 | This IE shall uniquely identify the SEPP that is sending the response. This IE is used to store the negotiated security capability against the right SEPP. |
| selectedSecCapability | SecurityCapability | M | 1 | This IE shall contain the security capability selected by the responding SEPP. |

As can be seen from Tables 1 and 2, sender attribute is a mandatory parameter of both the SecNegotiateReqData and SecNegotiateRspData information elements and contains the FQDN of the SEPP that sends the request or response. It is this FQDN that can be cross validated with the TLS layer identity.

In step 804, the SEPP compares the first and second identifiers for the first node. For example, the SEPP may compare the TLS identifier extracted from the X.509 certificate with the N32-c identifier extracted from the SecNegotiateRspData or SecNegotiateReqData information element of the N32-c security capability negotiation message.

In step 806, if the identifiers do not match, control proceeds to step 808 where the SEPP classifies the second (N32-c) identity of the first node as invalid. Control then proceeds to step 810, where the SEPP blocks inter-PLMN communications from the first node.

Returning to step 806, if the TLS and N32-c application layer identities match, control proceeds to step 812 where the SEPP performs a lookup for the identity for the first node in the peer SEPP database. Since the identities from the TLS layer and the N32c (application) layer match in step 806, the lookup may be performed using either the TLS layer or N32-c layer identity. The peer SEPP database may be provisioned by the network operator with the identities of SEPPs with which a give SEPP in the operator's network is permitted to communicate. Such SEPPs are referred to herein as peer SEPPs because they may be associated with PLMNs of peer network operators.

In step 814, if the identity is present in the peer SEPP database, control proceeds to step 816 where the SEPP allows inter-PLMN communications with the first node. If the identity is not present in the database, control proceeds to step 810 where the SEPP blocks inter-PLMN communications with the first node.

The subject matter described herein improves network security between SEPPs and PLMNs by performing cross-validation of identities exchanged between SEPPs in different network protocol layers. By comparing an N32-c identity with a TLS layer identity that is difficult to spoof, the SEPPs described herein reduce the likelihood of a successful spoofing attack during the N32-c security capability exchange procedure. In addition, because the cross-validation steps described herein can be both the initiating and responding SEPP in an N32 security capability negotiation, the likelihood of an attacker successfully impersonating either end of an N32-c connection is reduced.

The disclosure of each of the following references is incorporated herein by reference in its entirety.

REFERENCES

1. IETF RFC 5246; The Transport Layer Security (TLS) Protocol, Version 1.2; August 2008
2. IETF RFC 3280; Internet X.509 Public Key Infrastructure Certificate and Certificate Revocation List (CRL) Profile, April 2002.
3. 3GPP TS 29.573; $3^{rd}$ Generation Partnership Project; Technical Specification Group Core Network and Terminals; 5G System; Public Land Mobile Network (PLMN) Interconnection; Stage 3 (Release 16) V16.3.0 (2020-07)
4. 3GPP TS 33.501; $3^{rd}$ Generation Partnership Project; Technical Specification Group Services and System Aspects; Security Architecture and Procedures for the 5G System; (Release 16), V16.3.0 (2020-07).
5. 3GPP TS 29.510; $3^{rd}$ Generation Partnership Project; Technical Specification Group Core Network and Terminals; 5G System; Network Function Repository Services; Stage 3 (Release 16), V16.4.0 (2020-07).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for mitigating 5G roaming spoofing attacks, the method comprising:
 obtaining, by a security edge protection proxy (SEPP) and from a transport layer security (TLS) message from a first node, a first identifier for the first node, wherein the first identifier for the first node is a fully qualified domain name (FQDN) of the first node located in a subject alternative name field of an X.509 certificate in the TLS message;
 obtaining, by the SEPP and from an N32-c security capability negotiation message from the first node, a second identifier for the first node, wherein the second identifier is an FQDN located in a sender attribute of a SecNegotiateRegData or SecNegotiateRspData information element of the N32-c security capability negotiation message;
 comparing the first and second identifiers for the first node;
 when the SEPP determines that first and second identifiers do not match:
  determining that second identifier for the first node is invalid; and
  in response to determining that the second identifier for the first node is invalid, blocking inter-public land mobile network (PLMN) communications with the first node; and
 when the SEPP determines that the first and second identifiers match:
  performing a lookup for either the first identifier or the second identifier for the first node in a peer SEPP database; and
  if either of the first identifier or the second identifier is present in the peer SEPP database, allowing inter-public land mobile network (PLMN) communications with the first node.

2. The method of claim 1 wherein the TLS message comprises a TLS certificate message.

3. The method of claim 1 wherein the SEPP is a responding SEPP in an N32-c security capability negotiation procedure and wherein obtaining the second identifier for the first node includes extracting the second identifier for the first node from a sender attribute of the Sec NegotiateReqData information element of the N32-c security capability negotiation message.

4. The method of claim 1 wherein the SEPP is an initiating SEPP in an N32-c security capability negotiation procedure and wherein obtaining the second identifier for the first node includes extracting the second identifier for the first node from a sender attribute of the SecNegotiateRspData information element of the N32-c security capability negotiation message.

5. The method of claim 1 comprising,
 in response to determining that the first and second identifiers for the first node match and that a matching identifier is not present in the peer SEPP database, blocking inter-PLMN communications from the first node.

6. A system for mitigating 5G roaming spoofing attacks, the system comprising:
 a security edge protection proxy (SEPP) including at least one processor and a memory; and
 a 5G roaming spoofing attack mitigation module implemented by the at least one processor and configured to:
  obtain, from a transport layer security (TLS) message from a first node, a first identifier for the first node, wherein the first identifier for the first node is a fully qualified domain name (FQDN) of the first node located in a subject alternative name field of an X.509 certificate in the TLS message;
  obtain, from an N32-c security capability negotiation message from the first node, a second identifier for the first node, wherein the second identifier is an FQDN located in a sender attribute of a SecNegotiateReqData or Sec NegotiateRspData information element of the N32-c security capability negotiation message;
  compare the first and second identifiers for the first node;
  when the 5G roaming spoofing attack mitigation module determines that first and second identifiers do not match, the 5G roaming spoofing attack mitigation module is configured to:
   determine that second identifier for the first node is invalid; and
   in response to determining that the second identifier for the first node is invalid, block inter-public land mobile network (PLMN) communications with the first node; and
  when the 5G roaming spoofing attack mitigation module determines that first and second identifiers match, the 5G roaming spoofing attack mitigation module is configured to:
   perform a lookup for either the first identifier or the second identifier for the first node in a peer SEPP database; and
   if either of the first identifier or the second identifier is present in the peer SEPP database, allow inter-public land mobile network (PLMN) communications with the first node.

7. The system of claim 6 wherein the TLS message comprises a TLS certificate message.

8. The system of claim 6 wherein the SEPP is a responding SEPP in an N32-c security capability negotiation procedure and wherein 5G roaming spoofing attack mitigation module is configured to obtain the second identifier for the first node by extracting the second identifier for the first node from a sender attribute of the SecNegotiateReqData information element of the N32-c security capability negotiation message.

9. The system of claim 6 wherein the SEPP is an initiating SEPP in an N32-c security capability negotiation procedure and wherein the 5G roaming spoofing attack mitigation module is configured to obtain the second identifier for the first node by extracting the second identifier for the first node from a sender information element attribute of the SecNegotiateRspData information element of the N32-c security capability negotiation message.

10. The system of claim 6 wherein the 5G roaming spoofing attack mitigation module is configured to,
 in response to determining that the first and second identifiers for the first node match and that a matching identifier is not present in the peer SEPP database, block inter-PLMN communications from the first node.

11. A non-transitory computer readable medium having stored thereon executable instructions that when executed by a processor of a computer control the computer to perform steps comprising:
 obtaining, by a security edge protection proxy (SEPP) and from a transport layer security (TLS) message from a first node, a first identifier for the first node, wherein the first identifier for the first node is a fully qualified domain name (FQDN) of the first node located in a subject alternative name field of an X.509 certificate in the TLS message;

obtaining, by the SEPP and from an N32-c security capability negotiation message from the first node, a second identifier for the first node, wherein the second identifier is an FQDN located in a sender attribute of a SecNegotiateRecpata or SecNegotiateRspData information element of the N32-c security capability negotiation message;

comparing the first and second identifiers for the first node;

when the SEPP determines that first and second identifiers do not match:

determining that second identifier for the first node is invalid; and in response to determining that the second identifier for the first node is invalid, blocking inter-public land mobile network (PLMN) communications with the first node; and when the SEPP determines that the first and second identifiers match:

performing a lookup for either the first identifier or the second identifier for the first node in a peer SEPP database; and if either of the first identifier or the second identifier is present in the peer SEPP database, allowing inter-public land mobile network (PLMN) communications with the first node.

12. The non-transitory computer readable medium of claim 11 wherein the TLS message comprises a TLS certificate message.

* * * * *

UNITED STATES PATENT AND TRADEMARK OFFICE
CERTIFICATE OF CORRECTION

PATENT NO. : 11,825,310 B2
APPLICATION NO. : 17/095420
DATED : November 21, 2023
INVENTOR(S) : Rajput et al.

It is certified that error appears in the above-identified patent and that said Letters Patent is hereby corrected as shown below:

On the Title Page

On page 4, Column 2, item [56], Line 14, delete "Servces" and insert -- Services --, therefor.

On page 4, Column 2, item [56], Line 34, delete "for" and insert -- of --, therefor.

On page 5, Column 1, item [56], Line 60, delete "Telecommunication" and insert
-- Telecommunications --, therefor.

On page 6, Column 1, item [56], Line 16, delete ""Digitial" and insert -- "Digital --, therefor.

On page 6, Column 2, item [56], Lines 11-12, delete "wwwappmesh.com" and insert
-- www.appmesh.com --, therefor.

On page 6, Column 2, item [56], Line 16, delete "EDG" and insert -- EDGE --, therefor.

On page 6, Column 2, item [56], Line 20, delete "Internatioanl" and insert -- International --, therefor.

On page 6, Column 2, item [56], Line 28, delete "PCT/U32009/061187" and insert
-- PCT/US2009/061187 --, therefor.

On page 7, Column 1, item [56], Line 41, delete "#SZ-139E" and insert -- #S2-139E --, therefor.

On page 7, Column 2, item [56], Line 7, delete "3GPTT" and insert -- 3GPP --, therefor.

On page 8, Column 1, item [56], Line 59, delete "Tel?" and insert -- Tel! --, therefor.

In the Specification

In Column 10, Line 5, TABLE 1, delete "response." and insert -- request. --, therefor.

Signed and Sealed this
Eleventh Day of June, 2024

*Katherine Kelly Vidal*
*Director of the United States Patent and Trademark Office*

CERTIFICATE OF CORRECTION (continued)
U.S. Pat. No. 11,825,310 B2

In the Claims

In Column 13, Line 15, in Claim 1, delete "SecNegotiateRegData" and insert
-- SecNegotiateReqData --, therefor.

In Column 13, Line 38, in Claim 2, delete "wherein the TLS message comprises" and insert
-- wherein obtaining the first identifier for the first node from a TLS message includes obtaining the first identifier from a certificate contained in --, therefor.

In Column 13, Lines 43-44, in Claim 3, delete "Sec NegotiateReqData" and insert
-- SecNegotiateReqData --, therefor.

In Column 14, Line 8, in Claim 6, delete "Sec NegotiateRspData" and insert
-- SecNegotiateRspData --, therefor.

In Column 15, Lines 7-8, in Claim 11, delete "SecNegotiateRecpata" and insert
-- SecNegotiateReqData --, therefor.